United States Patent [19]

Gotoda et al.

[11] 4,201,641

[45] May 6, 1980

[54] RADIATION GRAFTING PROCESS FOR PREPARING A MEMBRANE FOR BATTERY SEPARATOR

[75] Inventors: Masao Gotoda, Takasaki; Toshio Okada, Kadoma; Kazuo Murata, Takatsuki; Kusuhiko Takahashi, Tokyo, all of Japan

[73] Assignees: Japan Atomic Energy Research Institute; Toshiba Ray-O-Vak K.K., both of Tokyo; Yuasa Battery Co., Ltd., Osaka, all of Japan

[21] Appl. No.: 926,923

[22] Filed: Jul. 21, 1978

[30] Foreign Application Priority Data

Jul. 26, 1977 [JP] Japan .................................. 52/89653

[51] Int. Cl.$^2$ ............................................... C08F 8/00
[52] U.S. Cl. .............................. 204/159.17; 429/254; 525/244; 525/301
[58] Field of Search .................... 204/159.17; 429/254

[56] References Cited

U.S. PATENT DOCUMENTS

| | | |
|---|---|---|
| 3,180,908 | 4/1965 | van Essen et al. .................. 260/881 |
| 3,427,206 | 2/1969 | Scardaville et al. ................ 136/146 |
| 3,839,172 | 10/1974 | Chapiro et al. ................ 204/159.17 |
| 3,939,049 | 2/1976 | Ratner et al. .................... 204/159.13 |
| 4,122,133 | 10/1978 | Bernstein et al. ................ 260/878 R |

*Primary Examiner*—Richard B. Turer
*Attorney, Agent, or Firm*—Browdy and Neimark

[57] ABSTRACT

A process is, herein, disclosed for preparing a membrane used for prevention of short-circuiting between the anode and the cathode of a battery comprising contacting a polyethylene film with an aqueous solution of acrylic acid, water, ethylene dichloride and ferrous salt or cupric salt and irradiating with ionizing radiation to obtain a polyethylene film with acrylic acid molecules grafted uniformly thereon.

10 Claims, 2 Drawing Figures

RADIATION GRAFTING PROCESS FOR PREPARING A MEMBRANE FOR BATTERY SEPARATOR

BACKGROUND OF THE INVENTION (1) Field of the Invention

This invention relates to a process for preparing a membrane for use as a battery separator.

(2) Description of the Prior Art

A graft film prepared by graft polymerizing polyethylene film with acrylic acid has been conventionally used for a separator membrane of battery. U.S. Pat. No. 3,427,206 discloses a good electrically-conductive film available for a separator membrane of a battery prepared by immersing a polyethylene film in a solution comprising aromatic hydrocarbon solvents such as benzene and acrylic acid and, optionally, a small quantity of carbon tetrachloride and irradiating with $\gamma$-rays. However, the method of U.S. Pat. No. 3,427,206 suffers from the defects that a homopolymer of acrylic acid is apt to be formed and it is difficult to obtain a polyethylene film with acrylic acid grafted uniformly thereon. That is to say, acrylic acid is easily polymerized by irradiation with ionizing radiation, and therefore, when the acrylic acid is irradiated with ionizing radiation in the presence of polyethylene film, the acrylic acid is polymerized in the solution phase and is spent uselessly before graft reaction with the polyethylene film occurs. The homopolymer of acrylic acid formed in the invention disclosed in U.S. Pat. No. 3,427,206 brings about not only the loss of acrylic acid, but also, because the homopolymer adheres relatively strongly, it is very troublesome to remove from the film finally obtained. Furthermore, the polymerization of acrylic acid proceeds at an increasing rate; when the graft reaction occurs at certain points of the polyethylene, the acrylic acid easily diffuses into these parts to cause acceleration of the graft reaction and consequently it is very difficult to prepare a homogeneous graft film.

In order to solve the defects of the prior art as stated above, one method has been adopted by those skilled in the art whereby an aromatic hydrocarbon solution containing a small quantity of acrylic acid is used and the graft reaction is carried out at relatively low dose rate. However, it is difficult to prepare a homogeneous graft film even when the graft reaction takes place at a low rate of polymerization. And therefore, for preparation of a homogeneous graft film by this method, irradiation with ionizing radiation for a period of from 10 hours up to several days is required, which causes a lowering of efficiency.

As stated above, the prior art methods suffer from the defects that the monomer is not used efficiently, a homogeneous graft film can not be prepared and reproducibility of the graft reaction is invariably poor.

We have carried out a variety of experiments for resolving the defects of prior art as stated above. As a result, we have succeeded in the preparation of a homogeneous graft polymer of low electrical resistivity.

SUMMARY OF THE INVENTION

Accordingly, one object of this invention is to provide a novel process for preparing a homogeneous graft film wherein the formation of homopolymer is minimized and the efficiency of utilization of monomer is improved.

Another object of this invention is to provide a process for preparing a homogeneous graft film having excellent electrical properties suitable for separator membrane for battery.

Other objects and advantages of this invention are made clear in the following description.

DETAILED DESCRIPTION OF THE INVENTION

This invention relates to a process for preparing a separator membrane used for prevention of short-circuiting between the anode and the cathode of a battery, especially alkali battery (hereinafter referred to as "battery").

Figure 1:
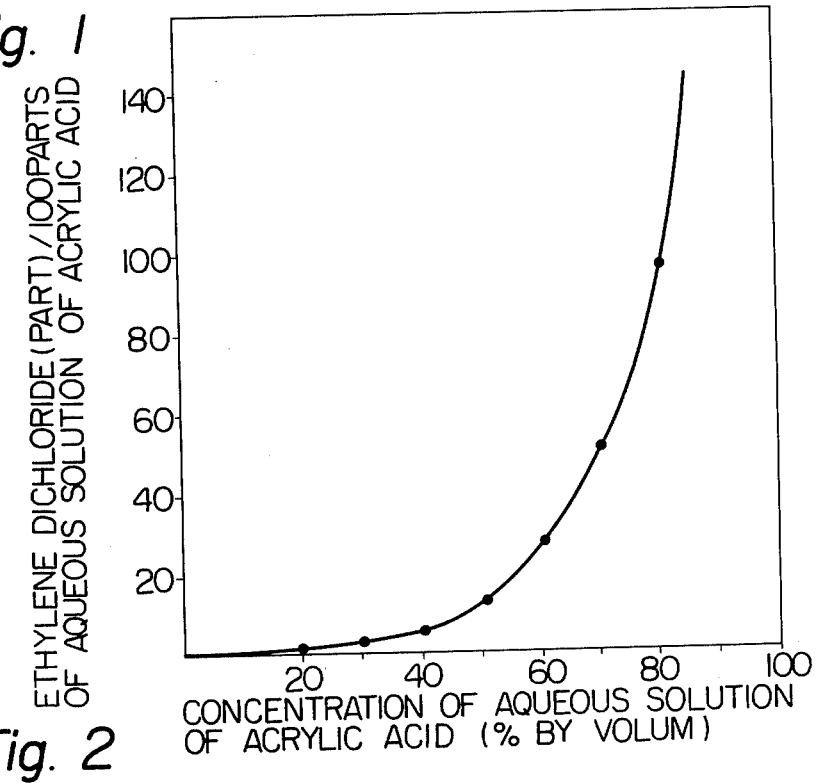
FIG. 1 is a graph showing the amount of ethylene dichloride to be added to aqueous solutions of acrylic acid of various kinds of concentration at 23° C. without the separation of solution phase occurring.

In accordance with this invention, a separator membrane for the battery can be prepared by contacting polyethylene film of from 10 to $100\mu$, preferably 15 to $50\mu$, in thickness with a solution of acrylic acid and then irradiating with an ionizing radiation to cause graft polymerization. The method of this invention is characterized by using an aqueous solution comprising acrylic acid, ethylene dichloride and a small quantity of ferrous salt or cupric salt instead of the solution comprising aromatic hydrocarbon and acrylic acid and, optionally, carbon tetrachloride used in the prior art methods. The concentration of the aqueous solution of acrylic acid used in this invention is from 30% to 80% by volume, preferably from 50% to 80% by volume, of the solution. When it is less than 30%, the amount of ethylene dichloride to be added into the solution is restricted and in addition to that, not only is the rate of graft polymerization lowered but also the electrical properties of the graft film obtained are not so good. On the other hand, when the concentration of the aqueous solution of acrylic acid is more than 80%, more ethylene dichloride must be added to the solution; this can improve the rate of polymerization of acrylic acid, but ferrous salt or cupric salt in an amount large enough to inhibit the formation of homopolymer of acrylic acid can not be added to the solution. Therefore, a concentration of the aqueous solution of acrylic acid of more than 80% is not preferred in this invention. While the amount of ethylene dichloride to be added to the solution can be varied depending upon the concentration of the aqueous solution of acrylic acid, at least 3 parts by volume of ethylene dichloride should be added to 100 parts by volume of the aqueous solution of acrylic acid and ethylene dichloride may be added to the aqueous solution of acrylic acid until the phase of solution becomes separated and turbid. In FIG. 1, the amount of ethylene dichloride to be added to the aqueous solution of acrylic acid without the separation of solution phase occurring is illustrated as a function of the concentration of the aqueous solution of acrylic acid. The higher the concentration of the aqueous solution of acrylic acid, the more ethylene dichloride is to be added.

The ethylene dichloride used in the method of this invention is a swelling agent for polyethylene, the addition of which considerably increases the rate of polymerizing acrylic acid and provides a uniform distribution of an acrylic acid grafted polymer within the polyethylene film.

The ferrous or cupric salt added in the method of this invention is capable of inhibiting the formation of a homopolymer of acrylic acid in the solution surrounding the polyethylene film but it does not prevent grafting of acrylic acid onto the film. Preferred examples of the ferrous salt are water soluble ferrous salts such as Mohr's salt (ammonium ferrous sulfate), ferrous chloride, ferrous nitrate, etc. Preferred examples of the cupric salt are water soluble cupric salts such as cupric sulfate, cupric chloride, cupric nitrate, cupric acetate, etc. These salts, if added in an amount of $10^{-3}$ to $10^{-1}$ mole/l, are capable of inhibiting the formation of acrylic acid in the solution and helping achieve uniform graft reaction in the polyethylene film.

According to the method of this invention, a suitable amount of ferrous salt or cupric salt is added to a mixture of acrylic acid, water and ethylene dichloride, a polyethylene film is immersed in the mixture, and irradiated, as it remains immersed, with ionizing radiation. Examples of the ionizing radiation are $\gamma$ rays from Cobalt 60, electron beams from an accelerator, etc; $\gamma$ rays from Cobalt 60 are preferred. The dose to be provided varies with the concentration or temperature to be employed, and the range 0.001 to 2 Mrad, especially 0.01 to 1 Mrad, is preferred. There is no particular limitation on the irradiation temperature but room temperature is most convenient for the purpose of this invention.

The polyethylene to be used in the method of this invention may be prepared either by low pressure method or high pressure method, but a so-called low-density polyethylene that is prepared by high pressure method is preferred because it allows faster graft polymerization. The preferred thickness of the base polyethylene film is 10 to 100$\mu$, especially 10 to 50$\mu$.

The base polyethylene film may be provided with improved heat resistance and chemical resistance by crosslinking it as a result of prior irradiation with radiation.

According to the method of this invention, the formation of a by-product homopolymer of acrylic acid is substantially zero or at an extremely low level such that any homopolymer formed can easily be removed by washing with water at room temperature. In this invention, the increase in the weight of a grafted, water washed and dried polyethylene film over that of the ungrafted polyethylene film is referred to as the degree of grafting. In the method of this invention, a suitable graft ratio ranges from 40 to 150%. A graft ratio less than 40% results in higher electrical resistivity whereas, if the degree of grafting is higher than 150%, the electrical resistivity no longer decreases but the strength characteristics of the film decrease.

Another advantage of the method of this invention is that it provides a battery separator membrane which has considerably lower electrical resistivity than the conventional product with the same degree of grafting.

As described in the foregoing pages, this invention provides an improved method of preparing an acrylic acid grafted film for use as a battery separator membrane, which method is not only capable of reducing the production cost by simplifying the procedure of washing for removal of a homopolymer of acrylic acid but providing a battery diaphragm of better quality than the product manufactured by the conventional method.

The present inventors therefore firmly believe that this invention has a very high commercial value.

The method of this invention is now described in greater detail by reference to the following examples and comparative examples. Unless otherwise specified, the composition of a polymerization solution is based on volume.

EXAMPLE 1

A 20$\mu$ thick polyethylene film having a melt index (MI) of 2.0 and a density of 0.921 (a product of Asahi Dow, 2135) was cut into a 21×21 cm piece and immersed in a mixture consisting of 100 parts of 80% aqueous solution of acrylic acid, 25 parts of ethylene dichloride and $1 \times 10^{-3}$ mole/l of Mohr's salt. As immersed, the test piece was irradiated with $\gamma$-rays from Cobalt 60-2000 Ci at a dose rate of $2.7 \times 10^4$ rads/hr at 23° C. for 15 hours to provide a dose of 0.05 Mrad. The solution surrounding the irradiated film was not found viscous; the unreacted monomer and the homopolymer produced in a small amount could be removed by washing the film with cold water for 30 minutes after irradiation. The increase in weight after drying, or degree of grafting was 50.2%.

The electrical resistivity of the graft film thus obtained was measured by voltage drop method using an aqueous solution containing 40 wt% of potassium hydroxide (KOH): a 3×3 cm sample was cut out of the graft film of the above dimensions and immersed in an aqueous solution containing 40 wt% of KOH at room temperature for 1 hour to provide a potassium salt (of the film). Measurement of electrical resistivity was made on five such film samples. The electrical resistivities of the five samples, were in the range of 165 to 190 m$\Omega$/cm$^2$/sheet, and the average was 180 m$\Omega$/cm$^2$/sheet.

COMPARATIVE EXAMPLE 1

A polyethylene film the same as the one used in Example 1 was immersed in a mixture consisting of acrylic acid, xylene and carbon tetrachloride (19:78:3) and irradiated with $\gamma$-rays from Cobalt 60-2000 Ci at a dose rate of $2.4 \times 10^4$ rad/hr at 23° C. for 34.1 hours to provide a dose of 0.8 Mrad. A large amount of a homopolymer of acrylic acid was found deposited on the irradiated film, and it could be removed only by washing with heated water at 90° C. for at least 1 hour. The degree of grafting after drying was 51.4%. The graft film obtained was not uniform; the electrical resistivity of each of the five samples was within the range of 1400 to 2000 m$\Omega$/cm$^2$/sheet, providing an average of 560 m$\Omega$/cm$^2$/sheet.

It is therefore clear that according to the method of this invention, a homopolymer of acrylic acid is formed in only a small amount, and a battery separator membrane having high uniformity and excellent electrical properties can be prepared.

EXAMPLE 2

A polyethylene film the same as the one used in Example 1 was immersed in a mixture consisting of 100 parts of 60% aqueous solution of acrylic acid, 10 parts of ethylene dichloride and $5 \times 10^{-3}$ mole/l of Mohr's salt. As immersed, the film was irradiated with $\gamma$-rays from Cobalt 60 at a dose rate of $2.7 \times 10^4$ rad/hr at 23° C. for 7.7 hours to provide a dose of 0.2 Mrad. The solution surrounding the irradiated film was not found viscous. The degree of grafting as determined by measurement of weight after washing with cold water and drying was 81.11%. The graft film was found uniform, providing an average electrical resistivity of 90 mΩ/cm²/sheet.

COMPARATIVE EXAMPLE 2

The procedure of Comparative Example 1 was repeated except that the irradiation time was 50.5 hours. A graft film having a degree of grafting of 82.4% was obtained. After the graft polymerization, a large amount of a homopolymer was found in the solution surrounding the film. The graft film obtained was not uniform. The average electrical resistivity of the film was 150 mΩ/cm²/sheet, suggesting poor electrical properties of the control as compared with the graft film prepared by the method of this invention.

EXAMPLES 3 to 6

A polyethylene film the same as the one used in Example 1 was immersed in an acrylic acid-base graft polymerization liquor of various compositions. Table 1 shows the results of the graft polymerization and the electrical resistivity of each graft film obtained.

As the table shows, the use of an aqueous solution of acrylic acid containing ethylene dichloride and Mohr's salt resulted in the least production of a by-product homopolymer, thus providing acrylic acid grafted polyethylene film which was low in electrical resistivity and advantageous as a battery separator membrane. A control which did not use ethylene dichloride showed low graft polymerization rate and provided a graft film which was low in uniformity and electrical properties.

COMPARATIVE EXAMPLE 3 tained was uniform, having an average electrical resistivity of 78 mΩ/cm²/sheet.

EXAMPLE 8

The conditions for Example 7 were used except that ferrous chloride was replaced by cupric sulfate as a substance to be added to the aqueous solution of acrylic acid. The production of a by-product homopolymer in the solution was substantially zero, thus providing a graft film having a graft ratio of 75.6% and high in uniformity. The film had an average electrical resistivity of 1.05 mΩ/cm²/sheet.

EXAMPLE 9

The conditions of Example 1 were employed except that the unirradiated base polyethylene film was replaced by a polyethylene film irradiated with 10 Mrad of electron beams from a Van de Graaff accelerator at an accelerated voltage of 1.5 MeV and a beam current of 50μ A. The graft polymerization was substantially free from the production of a by-product homopolymer of acrylic acid in the solution, thus providing a graft film having a degree of grafting of 14.8% and high in uniformity. The film had an average electrical resistivity of 55 mΩ/cm²/sheet. To the best of the inventors' understanding, the film was crosslinked by irradiation with electron beams to provide good thermal stability, and the radicals formed by irradiation accelerated the graft reaction.

Table 2 shows the closed-circuit voltage of a silver oxide battery (referred to as G13 by JIS) as determined by using the membrane of Example 1 at 20° C. Table 2 also shows the result obtained by using the membrane of Comparative Example 1.

Table 1

| Ex. No. | Conc. of aq. sol. of acrylic acid (%) | Amount of ethylene dichloride added B/A[1] | Mohr's salt mole/l | Irradiation time hr | Dose Mrad | Degree of grafting (%) | Homo-polymer produced | Electrical[2] resistivity mΩ/cm²/sheet |
| --- | --- | --- | --- | --- | --- | --- | --- | --- |
| 3 | 30 | 3.5 | 5 × 10⁻³ | 3.0 | 0.21 | 50.5 | slight | 230 |
| 4 | 50 | 70 | 1 × 10⁻² | 1.0 | 0.03 | 47.5 | " | 320 |
| 5 | 60 | 25 | 5 × 10⁻³ | 1.5 | 0.04 | 72.5 | " | 110 |
| 6 | 80 | 30 | 5 × 10⁻³ | 0.5 | 0.014 | 106.0 | " | 60 |
| Com. Ex. 3 | | 0 | 5 × 10⁻³ | 0.5 | 0.014 | 24.8 | slight | 2,400 |
| 4 | | 30 | 0 | 0.5 | 0.014 | — | gelation | — |

[1]B/A; Ethylene dichloride added (parts)/aq. sol. of acrylic acid (100 parts)
[2]Electrical resistivity in 40% KOH aq. sol. dose rate: 2.7 × 10⁴ rad/hr, Irradiation temp.: 23° C.

Another control which did not use Mohr's salt under went a considerable degree of homopolymerization of acrylic acid in the solution, thus making it difficult to separate the graft film.

COMPARATIVE EXAMPLE 4

The advantageous effect of using both ethylene dichloride and Mohr's salt is apparent therefrom.

EXAMPLE 7

A polyethylene film the same as the one used in Example 1 was immersed in a mixture consisting of 100 parts of 70% aqueous solution of acrylic acid, 30 parts of ethylene chloride and 5×10⁻³ mole/l of ferrous chloride, and irradiated with γ-rays from Cobalt 60 at a dose rate of 1.0×10 rad/hr at 23° C. for 1 hour to provide a dose of 0.1 Mrad. The solution surrounding the irradiated film was not found viscous. As in Example 1, the film was washed with cold water. The graft ratio as determined after drying was 86.4%. The film thus ob- Table 2

| | closed-circuit voltage (V) |
| --- | --- |
| Ex. 1 | 1.44–1.46 |
| Com. Ex. 1 | 1.30–1.43 |

Figure 2:
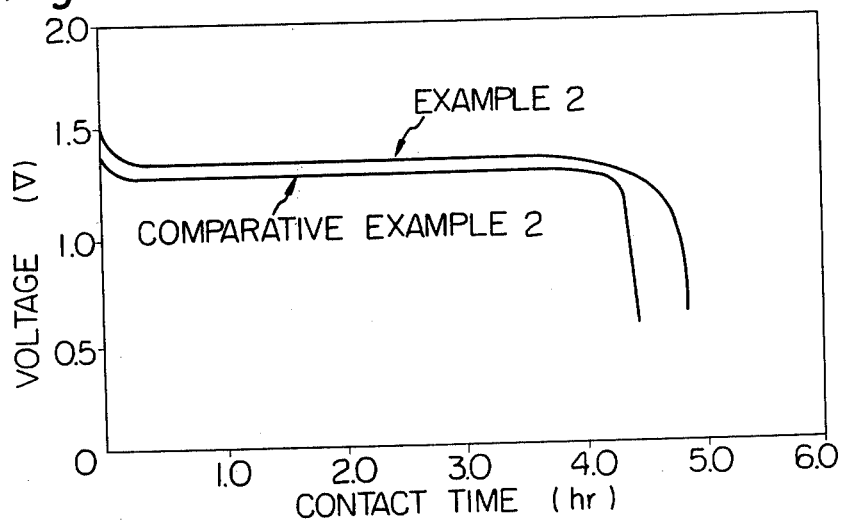
FIG. 2 is a graph showing the results of a continuous discharge test using the separator membrane prepared by this invention.

FIG. 2 shows the results of a continuous discharge test using the diaphragm of Example 2 in a battery G-13 at 20° C. The Figure also shows the result of the same test on the diaphragm of Comparative Example 2.

As Table 2 and FIG. 2 show, the silver oxide battery using the membrane prepared by this invention maintains a high operating voltage, and has a long life.

We claim:

1. A process for preparing a separator membrane for battery comprising contacting polyethylene with an aqueous solution of 30–80% by volume acrylic acid, said aqueous solution further containing at least 3 parts by volume of ethylene dichloride per 100 parts of aqueous solution and 0.001 to 0.1 mole of ferrous salt or cupric salt per liter of the total solution; and then irradiating with ionizing radiation of 0.01 to 2 Mrad.

2. The process of claim 1, wherein the thickness of the polyethylene film is from 10–100μ.

3. The process of claim 1, wherein the ferrous salt is one selected from the group consisting of Mohr's salt, ferrous chloride, ferrous nitrate and ferrous sulfate.

4. The process of claim 1, wherein the cupric salt is selected from the group consisting of cupric sulfate, cupric chloride, cupric nitrate, and cupric acetate.

5. The process of claim 1, wherein the dose of ionizing radiation is the range of 0.01 to 1 Mrad.

6. The process of claim 1, wherein the polyethylene film is low-density polyethylene prepared by a high pressure method.

7. The process of claim 1 wherein said polyethylene film is cross-linked.

8. The process of claim 1 wherein the thickness of the polyethylene film is 10–50μ.

9. A battery membrane separator membrane of uniform properties and low electrical resistivity made by the process of claim 2 wherein the weight of grafted polyethylene is 40% to 150% greater than the weight of the starting polyethylene film.

10. A battery separator membrane in accordance with claim 9 wherein the starting polyethylene film is low-density polyethylene of 10–50μ thickness, said membrane having a resistivity of less than 320 mΩ/cm$^2$/sheet.